US010747501B2

(12) United States Patent
Heddes et al.

(10) Patent No.: US 10,747,501 B2
(45) Date of Patent: Aug. 18, 2020

(54) PROVIDING EFFICIENT FLOATING-POINT OPERATIONS USING MATRIX PROCESSORS IN PROCESSOR-BASED SYSTEMS

(71) Applicant: QUALCOMM Incorporated, San Diego, CA (US)

(72) Inventors: Mattheus Cornelis Antonius Adrianus Heddes, Woodinville, WA (US); Natarajan Vaidhyanathan, Carrboro, NC (US); Robert Dreyer, Menlo Park, CA (US); Colin Beaton Verrilli, Apex, NC (US); Koustav Bhattacharya, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/118,099

(22) Filed: Aug. 30, 2018

(65) Prior Publication Data
US 2019/0065146 A1  Feb. 28, 2019

Related U.S. Application Data

(60) Provisional application No. 62/552,890, filed on Aug. 31, 2017.

(51) Int. Cl.
*G06F 7/483* (2006.01)
*G06F 7/544* (2006.01)
(Continued)

(52) U.S. Cl.
CPC .......... *G06F 7/483* (2013.01); *G06F 7/49936* (2013.01); *G06F 7/5443* (2013.01); *G06F 15/8092* (2013.01); *G06F 15/7807* (2013.01)

(58) Field of Classification Search
CPC .............................. G06F 7/5443; G06F 17/16
See application file for complete search history.

(56) References Cited

U.S. PATENT DOCUMENTS 4,622,650 A * 11/1986 Kulisch ................... G06F 7/483
708/603
4,822,650 A    4/1989 Horiki et al.
(Continued)

FOREIGN PATENT DOCUMENTS

EP          1229438 A2     8/2002

OTHER PUBLICATIONS

International Search Report and Written Opinion for PCT/US2018/049098, dated Nov. 20, 2018, 13 pages.
(Continued)

*Primary Examiner* — Chuong D Ngo
(74) *Attorney, Agent, or Firm* — Withrow & Terranova (57) ABSTRACT

Providing efficient floating-point operations using matrix processors in processor-based systems is disclosed. In this regard, a matrix-processor-based device provides a matrix processor comprising a positive partial sum accumulator and a negative partial sum accumulator. As the matrix processor processes pairs of floating-point operands, the matrix processor calculates an intermediate product based on a first floating-point operand and a second floating-point operand and determines a sign of the intermediate product. Based on the sign, the matrix processor normalizes the intermediate product with a partial sum fraction of the positive partial sum accumulator or the negative partial sum accumulator, then adds the intermediate product to the positive sum accumulator or the negative sum accumulator. After processing all pairs of floating-point operands, the matrix processor subtracts the negative partial sum accumulator from the positive partial sum accumulator to generate a final sum, then renormalizes the final sum a single time.

20 Claims, 6 Drawing Sheets

(51) Int. Cl.
*G06F 15/80* (2006.01)
*G06F 7/499* (2006.01)
G06F 15/78 (2006.01)

(56) References Cited

U.S. PATENT DOCUMENTS

| | | | |
|---|---|---|---|
| 6,256,655 B1 | 7/2001 | Ezer et al. | |
| 6,438,569 B1* | 8/2002 | Abbott | G06F 7/5443 |
| | | | 708/603 |
| 8,626,813 B1 | 1/2014 | Swartzlander et al. | |
| 2018/0173497 A1* | 6/2018 | Stewart | G06F 7/485 |

OTHER PUBLICATIONS

International Preliminary Report on Patentability for PCT/US2018/049098, dated Mar. 12, 2020, 8 pages.

* cited by examiner

PROVIDING EFFICIENT FLOATING-POINT OPERATIONS USING MATRIX PROCESSORS IN PROCESSOR-BASED SYSTEMS

PRIORITY APPLICATION

The present application claims priority under 35 U.S.C. § 119(e) to U.S. Provisional Patent Application Ser. No. 62/552,890 entitled "PROVIDING EFFICIENT FLOATING-POINT ADDITION OPERATIONS USING MATRIX PROCESSORS IN PROCESSOR-BASED SYSTEMS" and filed on Aug. 31, 2017, the contents of which is incorporated herein by reference in its entirety.

BACKGROUND

I. Field of the Disclosure

The technology of the disclosure relates generally to matrix handling in processor-based systems, and specifically to techniques and apparatus for efficient floating-point operations that are useful for matrix multiplication.

II. Background

The field of machine learning is directed to developing and studying algorithms that can make data-driven predictions or decisions by building a model from sample inputs. Machine learning may be applied to computing tasks where designing and programming explicit algorithms with acceptable performance is difficult or impracticable. One category of machine learning techniques, known as "deep learning," employs artificial neural networks (ANNs) containing multiple hidden layers to perform tasks such as pattern analysis and classification. The ANNs are first "trained" by determining operating parameters based on examples of typical inputs and corresponding desired outputs. The ANNs may then perform "inference," in which the determined operating parameters are used to classify, recognize, and/or process new inputs.

In ANNs used for deep learning, each hidden layer within the ANN uses output from the previous layer as input. Because each layer is represented as a two-dimensional matrix, the vast majority of computational operations involved in deep learning consist of matrix multiplication operations. Accordingly, optimization of matrix multiplication operations has the potential to greatly improve the performance of deep learning applications. In particular, processing units for performing floating-point matrix multiplication operations occupy greater chip area and consume more power than processing units for performing integer-based matrix multiplication. Thus, a more efficient apparatus for performing floating-point matrix multiplication operations is desirable.

SUMMARY OF TIRE DISCLOSURE

Aspects disclosed in the detailed description include providing efficient floating-point operations using matrix processors in processor-based systems. In this regard, in one aspect, a matrix-processor-based device comprising a matrix processor is provided. The matrix processor includes a positive partial sum accumulator and a negative partial sum accumulator. As the matrix processor processes pairs of floating-point operands (e.g., when performing matrix multiplication operations, as a non-limiting example), the matrix processor calculates an intermediate product based on a first floating-point operand and a second floating-point operand. After determining a sign of the intermediate product (i.e., whether the intermediate product is positive or negative), the matrix processor normalizes the intermediate product with a partial sum fraction of the positive partial sum accumulator or the negative partial sum accumulator, depending on the sign. The matrix processor then adds the intermediate product to the positive sum accumulator if the intermediate product is positive, or adds the intermediate product to the negative sum accumulator if the intermediate product is negative. After processing all pairs of floating-point operands, the matrix processor subtracts the value of the negative partial sum accumulator from the value of the positive partial sum accumulator to arrive at a final sum, then renormalizes the final sum a single time (as opposed to performing renormalization after each intermediate product is added). In this manner, the matrix processor reduces the number of processor cycles used for renormalization, thus improving power consumption and overall processor performance.

In another aspect, a matrix-processor-based device is provided. The matrix-processor-based device comprises a matrix processor that includes a positive partial sum accumulator and a negative partial sum accumulator. The matrix processor is configured to, for each pair of a first floating-point operand and a second floating-point operand of a plurality of pairs of floating-point operands, determine a sign of an intermediate product of the first floating-point operand and the second floating-point operand, indicating whether the intermediate product is positive or negative. The matrix processor is further configured to normalize the intermediate product with a partial sum fraction comprising one of a fraction of the positive partial sum accumulator and a fraction of the negative partial sum accumulator based on the sign of the intermediate product. The matrix processor is also configured to add the intermediate product to one of the positive partial sum accumulator and the negative partial sum accumulator based on the sign of the intermediate product. The matrix processor is additionally configured to subtract a value of the negative partial sum accumulator from a value of the positive partial sum accumulator to generate a final sum. The matrix processor is further configured to renormalize the final sum.

In another aspect, a matrix-processor-based device is provided. The matrix-processor-based device comprises a means for determining, for each pair of a first floating-point operand and a second floating-point operand of a plurality of pairs of floating-point operands, a sign of an intermediate product of the first floating-point operand and the second floating-point operand, indicating whether the intermediate product is positive or negative. The matrix-processor-based device further comprises a means for normalizing the intermediate product with a partial sum fraction comprising one of a fraction of a positive partial sum accumulator and a fraction of a negative partial sum accumulator based on the sign of the intermediate product. The matrix-processor-based device also comprises a means for adding the intermediate product to one of the positive partial sum accumulator and the negative partial sum accumulator based on the sign of the intermediate product. The matrix-processor-based device additionally comprises a means for subtracting the value of the negative partial sum accumulator from the value of the positive partial sum accumulator to generate a final sum. The matrix-processor-based device further comprises a means for renormalizing the final sum.

In another aspect, a method for providing efficient floating-point operations is provided. The method comprises, for each pair of a first floating-point operand and a second floating-point operand of a plurality of pairs of floating-point operands, determining, by a matrix processor of a matrix-processor-based device, a sign of an intermediate product of the first floating-point operand and the second floating-point operand, indicating whether the intermediate product is positive or negative. The method further comprises normalizing the intermediate product with a partial sum fraction comprising one of a fraction of a positive partial sum accumulator and a fraction of a negative partial sum accumulator based on the sign of the intermediate product. The method also comprises adding the intermediate product to one of the positive partial sum accumulator and the negative partial sum accumulator based on the sign of the intermediate product. The method additionally comprises subtracting the value of the negative partial sum accumulator from the value of the positive partial sum accumulator to generate a final sum. The method further comprises renormalizing the final sum.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1A:
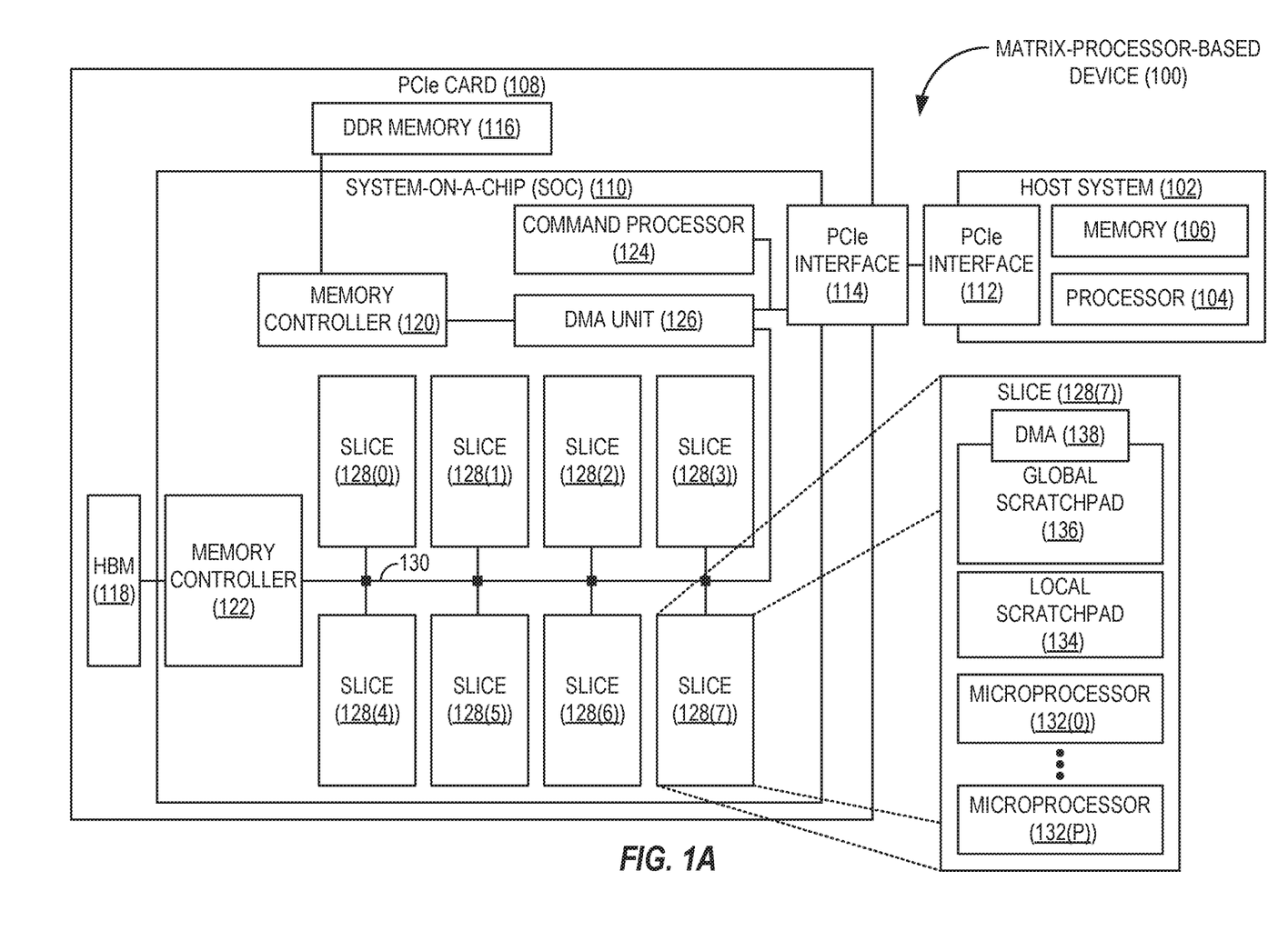
FIGS. 1A and 1B are block diagrams of an exemplary processor-based system including matrix processors configured to provide efficient floating-point matrix multiplication.
Figure 1B:
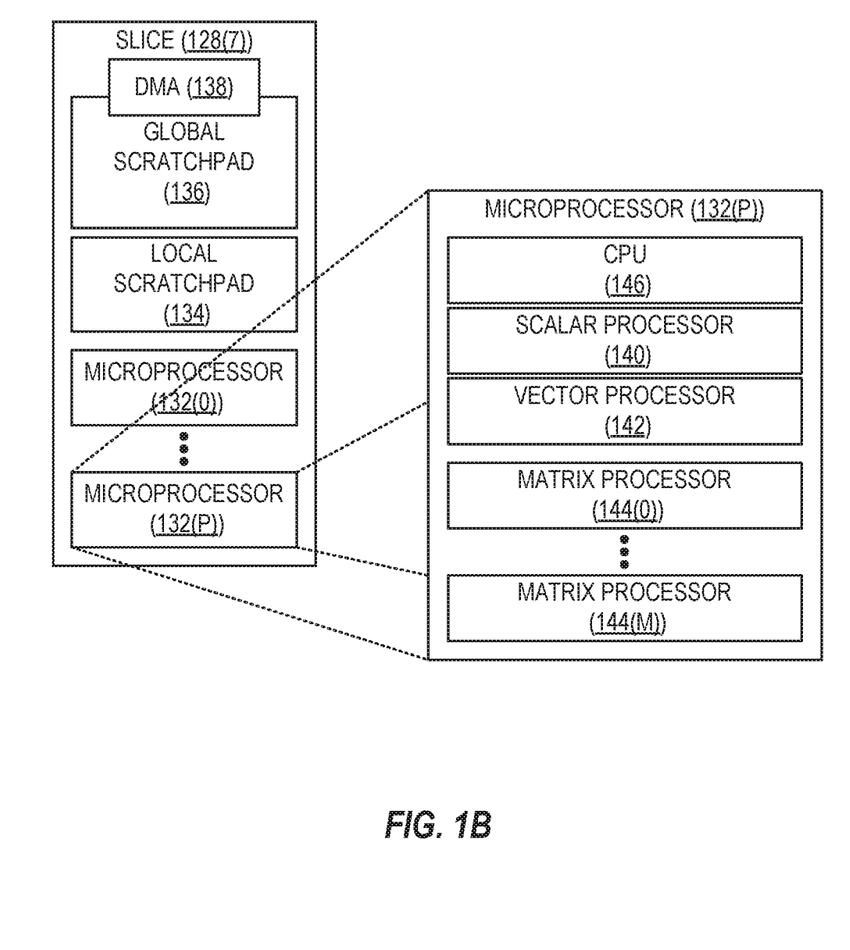

Aspects disclosed in the detailed description include providing efficient floating-point operations using matrix processors in processor-based systems. In this regard, FIGS. 1A and 1B illustrate an exemplary matrix-processor-based device 100 configured to provide efficient floating-point matrix multiplication using matrix processors. Referring to FIG. 1A, the matrix-processor-based device 100 provides a host system 102, which in some aspects may comprise an Arm®- or Intel® x86-based server computer. The host system 102 includes a processor 104 (e.g., one or more central processing units (CPUs), processors, and/or processor cores) and memory 106 (e.g., double data rate synchronous dynamic random access memory (DDR SDRAM)). The matrix-processor-based device 100 further provides a Peripheral Component Interconnect Express (PCIe) card 108, on which a system-on-a-chip (SoC) 110 is configured to communicate with the host system 102 via a PCIe interface 112 of the host system 102 and a PCIe interface 114 of the SoC 110. The PCIe card 108 also includes DDR memory 116 and high-bandwidth memory (HBM) 118, which interface with the SoC 110 via a memory controller 120 and a memory controller 122, respectively.

The SoC 110 provides a command processor 124, which in some aspects may comprise a conventional processor such as an ARM®- or INTEL® x86-based processor. The SoC 110 also includes a direct memory access (DMA) unit 126 that is configured to move data to and from the DDR memory 116 and the PCIe interface 114, and thereby to and from the host system 102. The SoC 110 of FIG. 1A provides eight (8) processor slices ("slices") 128(0)-128(7), which are interconnected by a network-on-chip (NoC) 130. It is to be understood that, in some aspects, the SoC 110 may include more or fewer slices 128(0)-128(7) than illustrated in FIG. 1A.

To illustrate the constituent elements of the slices 128(0)-128(7), FIG. 1A shows an expanded view of the slice 128(7). The slice 128(7) comprises a plurality of microprocessors 132(0)-132(P), along with a local scratchpad 134 and a global scratchpad 136. The local scratchpad 134 is a high-bandwidth memory that is accessible only by the microprocessors 132(0)-1321P) of the slice 128(7). In contrast, the global scratchpad 136 is a lower-bandwidth memory that is accessible by any of the slices 128(0)-128(7). To move data into and out of the local scratchpad 134 and the global scratchpad 136, the slice 128(7) provides a DMA unit 138, which is communicatively coupled to the NoC 130. It is to be understood that, in this example, each of the slices 128(0)-128(6) include elements corresponding to the elements of the slice 128(7) described above.

FIG. 1B provides a more detailed view of the constituent elements of the microprocessors 132(0)-132(P) of the slice 128(7) of FIG. 1A, using the microprocessor 132(P) as an example. As seen in FIG. 1B, the microprocessor 132(P) provides a scalar processor 140 and a vector processor 142. The microprocessor 132(P) further provides a plurality of matrix processors 144(0)-144(M). In the example of FIG. 1B, the matrix processors 144(0)-144(M) are configured to use 16-bit floating-point precision, as higher precision is both unnecessary for machine learning applications and also results in reduced performance. The scalar processor 140, the vector processor 142, and the matrix processors 144(0)-144(M) are controlled by a CPU 146, which in some aspects provides a specialized instruction set for matrix processing. It is to be understood that, in the example of FIG. 1B, each of the microprocessors 132(0)-132(P) includes elements corresponding to the elements of the microprocessor 132(P) described above.

The matrix-processor-based device 100 and its constituent elements as illustrated in FIGS. 1A and 1B may encompass any known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the matrix-processor-based device 100 may include elements in addition to those illustrated in FIGS. 1A and 1B, and/or may omit some elements illustrated in FIGS. 1A and 1B.

Figure 2:
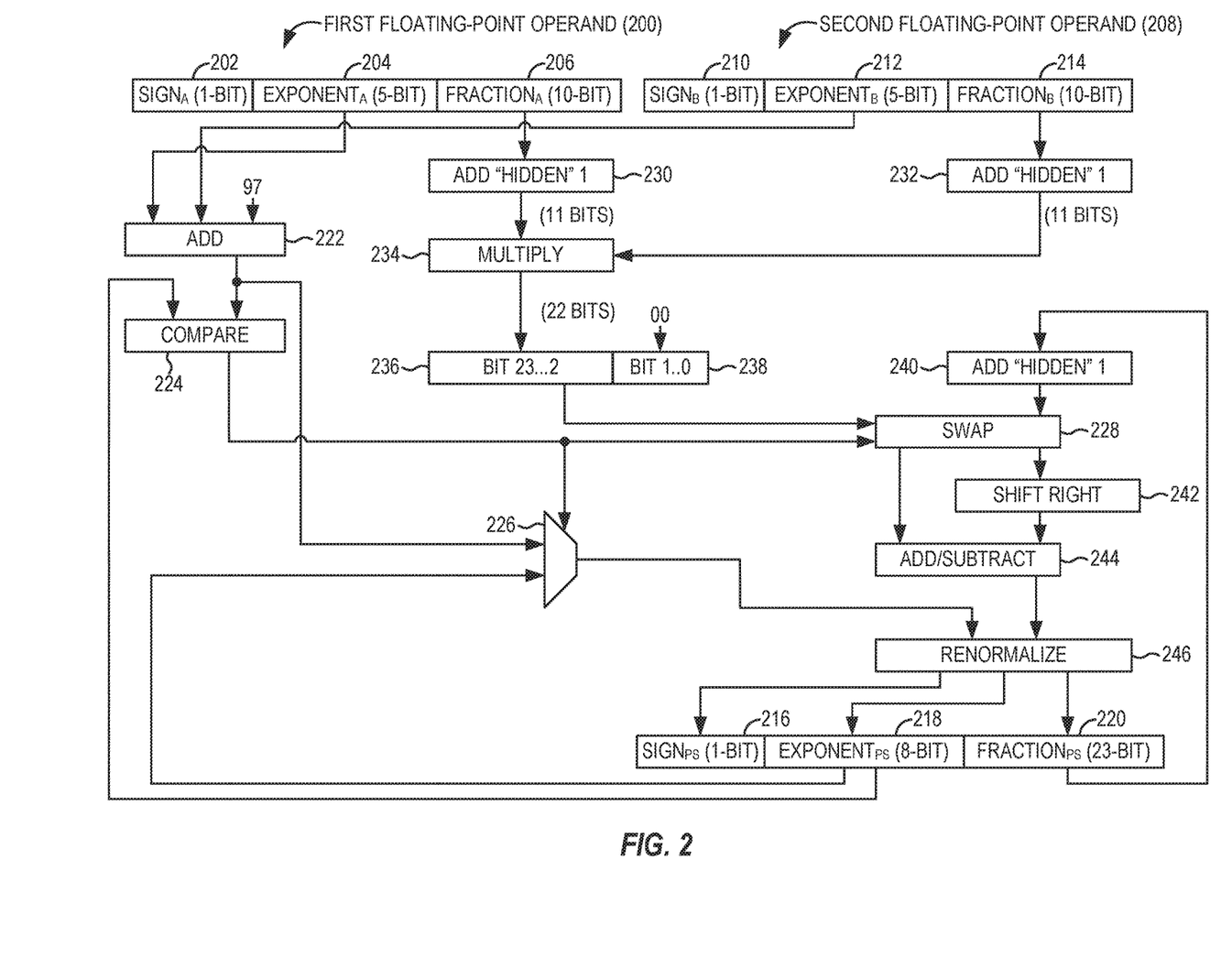
FIG. 2 is a block diagram illustrating conventional operations for performing floating-point matrix multiplication operations.

To perform matrix multiplication, each element of an output matrix is calculated as a "dot product," a sum of the products of elements of a row of a first input matrix and elements of a corresponding column of a second input matrix. Some deep learning applications for which the matrix processors 144(0)-144(M) of FIG. 1B may employed require floating-point precision when performing matrix multiplication operations. However, floating-point matrix multiplication operations typically require matrix processors that occupy greater processor area and consume more power than integer matrix multiplication operations. Before describing operations for providing efficient floating-point operations as disclosed herein, the operations of a conventional matrix processor for performing floating-point matrix multiplication are first discussed. In this regard, FIG. 2 is provided. In FIG. 2, a first floating-point operand 200 is represented by a one-bit (1-bit) sign 202, a five-bit (5-bit) exponent 204, and a 10-bit fraction 206. Likewise, a second floating-point operand 208 is represented by a one-bit (1-bit) sign 210, a five-bit (5-bit) exponent 212, and a 10-bit fraction 214. The first floating-point operand and the second floating-point operand may be one pair of a plurality of pairs of floating-point operands to be multiplied and summed to generate a dot product. A partial sum, represented by a one-bit (1-bit) sign 216, an eight-bit (8-bit) exponent 218, and a 23-bit fraction 220 are maintained in an accumulator to sum the results of the multiplication operations. It is to be understood that the sizes of the exponents 204, 212 and the fractions 206, 214 in some aspects may be larger or smaller than the five-bit (5-bit) exponents 204, 212 and the 10-bit fractions 206, 214 shown in FIG. 2.

To perform the floating-point multiplication when generating a dot product, the exponent 204 and the exponent 212 are first added together, as indicated by element 222. Note that, in the example of FIG. 2, the element 222 also receives an input having a value of 97. This value represents a constant value that is dependent on an exponent bias of the input arguments and an exponent bias of the partial sum being calculated. In this example, the value 97 is calculated as 2*(−15)+127, where the value 15 represents the exponent bias for half-precision floating point (FP16) numbers and 127 represents the exponent bias for single-precision floating point (FP32) numbers. The result calculated at element 222 is compared with the exponent 218 of the partial sum, as indicated by element 224, and the comparison result is forwarded to elements 226 and 228, which are addressed in greater detail below. The fraction 206 and the fraction 214 are multiplied next. Because the leading "1" of the binary representation of the fractions 206 and 214 are "hidden" (i.e., not stored as part of the fractions 206 and 214), a "'hidden' 1" is added to each of the fractions 206, 214, as indicated by elements 230 and 232, respectively, by prepending a bit having a value of one (1) as the most significant bit of the fractions 206, 214. The 11-bit values for the fractions 206 and 214 are then multiplied at element 234. The 22-bit product 236 is right-padded with two zeroes (0s) 238, and the resulting 24-bit value (referred to herein as the "intermediate product") is forwarded to element 228.

At element 228, the intermediate product of the fractions 206 and 214 is compared to the fraction 220 of the partial sum (after the "'hidden' 1" is added to the fraction 220 at element 240 by prepending a bit having a value of one (1) as the most significant bit of the fraction 220). The larger of the two remains unchanged, while the smaller of the two is normalized by shifting its bits to the right, as indicated by element 242. After normalization of the smaller value, the intermediate product of the fractions 206 and 214 is added to or subtracted from the fraction 220 as appropriate, as indicated by element 244. For example, at element 244, the intermediate product is subtracted from the fraction 220 if an exclusive-OR operation performed on the sign 202 of the first floating-point operand 200 and the sign 210 of the second floating-point operand 208 evaluates to true, and is added to the fraction 220 if the exclusive-OR operation evaluates to false.

The ultimate result is then renormalized at element 246. The process of renormalization comprises locating the leading "1" within the binary representation of the result, and then shifting the bits of the result to the left until the leading "1" has been shifted out of the binary representation. The exponent 218 of the partial sum is also adjusted as necessary, based on the renormalization and on the sum of the exponents 204 and 212 from element 224.

As the size of the matrices being multiplied grows, the number of operations required to perform a floating-point matrix multiplication operation increases dramatically. As a non-limiting example, consider a matrix processor configured to multiply two 32×32 matrices (i.e., each matrix has 32 rows and 32 columns). If the matrix processor provides 1,024 multiply/accumulate (MAC) units, each MAC unit must perform a total of 32 floating-point multiplication operations when calculating a dot product, resulting in a total of 32,768 floating-point multiplication operations. Accordingly, it is desirable to optimize the process of multiplying floating-point values to reduce the amount of processing time and power required.

Figure 3:
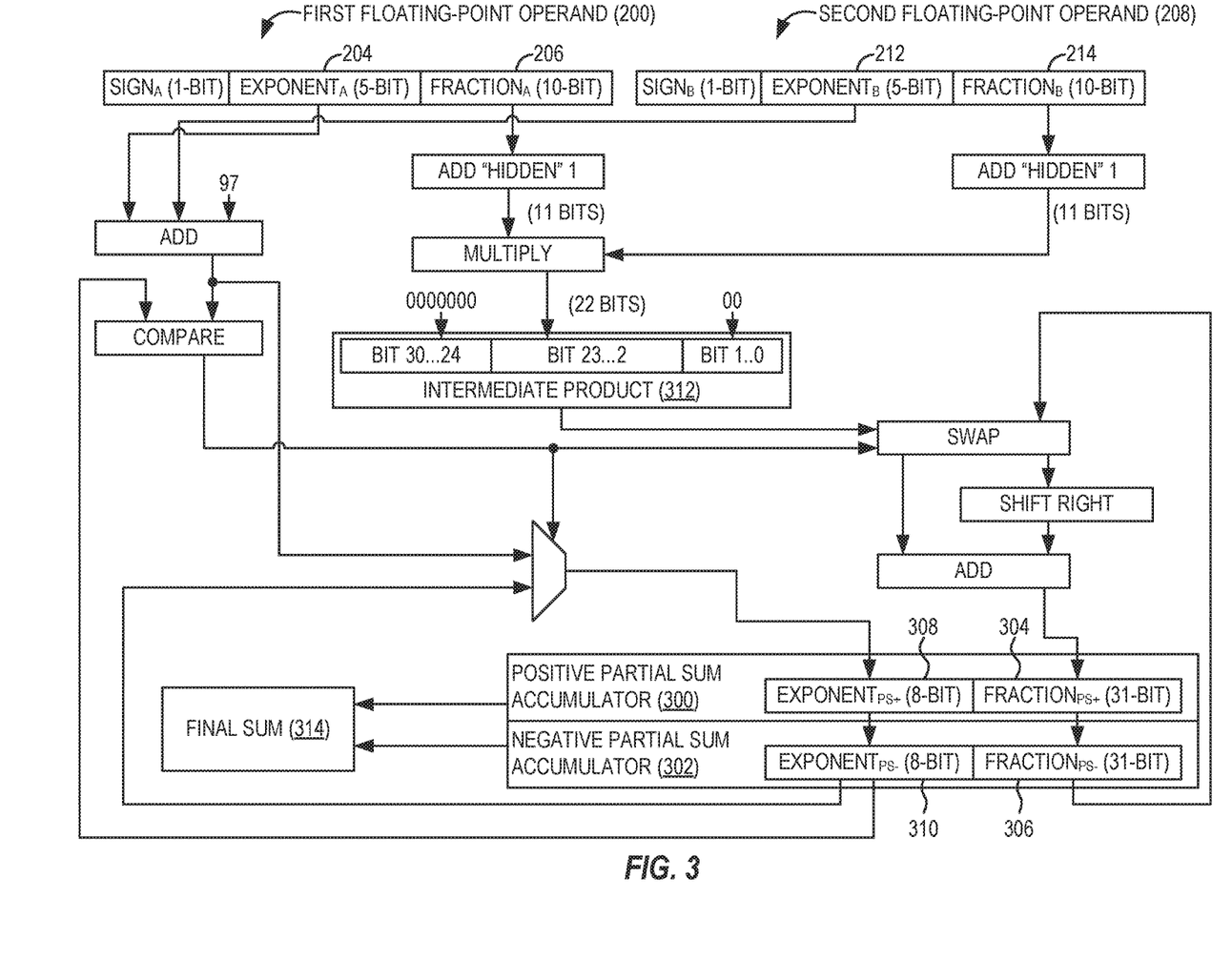
FIG. 3 is a block diagram illustrating exemplary operations of the matrix processors of FIGS. 1A and 1B for efficiently performing floating-point matrix multiplication operations.

In this regard, FIG. 3 is provided to illustrate exemplary elements of the matrix processors 144(0)-144(M) of FIG. 1B, and operations performed thereby to more efficiently multiply floating-point values during matrix multiplication operations. In the example of FIG. 3, data is processed in a manner similar to that described with respect to FIG. 2, except the sum of the fraction 220 and the product of the fractions 206 and 214 is not renormalized during the calculation of each dot product, as was performed at element 246 of FIG. 2. Instead, each of the matrix processors 144(0)-144(M) maintains two accumulators: a positive partial sum accumulator 300 for storing positive partial sums, and a negative partial sum accumulator 302 for storing negative partial sums. In the example of FIG. 3, the positive partial sum accumulator 300 and the negative partial sum accumulator 302 comprise 31-bit fractions 304 and 306, respectively, and eight (8)-bit exponents 308 and 310, respectively.

In exemplary operation, after the fractions 206 and 214 are multiplied to produce an intermediate product 312, the matrix processor 144(0)-144(M) determines a sign of the intermediate product 312 (indicating whether the intermediate product 312 is positive or negative). The intermediate product 312 is then normalized with a "partial sum fraction" (where the fraction 304 of the positive partial sum accumulator 300 is used as the partial sum fraction if the intermediate product 312 is positive, and the fraction 306 of the negative partial sum accumulator 302 is used as the partial sum fraction if the intermediate product is negative). In some aspects, normalizing the intermediate product 312 with the partial sum fraction may comprise performing a bitwise right-shift operation on the smaller of the intermediate product 312 and the partial sum fraction. Only one of the positive partial sum accumulator 300 and the negative partial sum accumulator 302 is updated during each processor cycle, based on the sign of the intermediate product 312 (i.e., the intermediate product 312 is added to the positive partial sum accumulator 300 if the intermediate product 312 is positive, or is added to the negative partial sum accumulator 302 if the intermediate product 312 is negative). The other one of the positive partial sum accumulator 300 and the negative partial sum accumulator 302 corresponding to the inverse of the sign of the intermediate product 312 may be clock-gated such that it does not consume power. At the end of calculating the dot product, the value stored in the negative partial sum accumulator 302 is subtracted from the value stored in the positive partial sum accumulator 300 to generate a final sum 314, which is renormalized a single time. Renormalization thus still consumes power, but only during one processor cycle at the end of the dot product calculation.

In some aspects, renormalization may be spread out over multiple processor cycles, and the hardware used for performing renormalization may be shared. As a non-limiting example, if the matrix multiplication operation requires 32 processor cycles, then the process of renormalization, if done in a second pipeline stage, may also be done in 32 cycles. While the overall latency of the matrix multiplication operation increases to a total of 64 processor cycles, the throughput remains the same (i.e., one matrix multiplication operation every 32 processor cycles). By enabling the logic for renormalization to "loop" over various output partial sum registers, less logic is required for renormalization overall. Additionally, the operations illustrated in FIG. 3 require less logic in the critical path, which allows the matrix processors 144(0)-144(M) to be operated at a higher clock frequency.

Note that the operations illustrated in FIG. 3 may negatively impact the accuracy of the floating-point multiplication operations, depending on the sequence of input values. To compensate for this possibility, the positive partial sum accumulator 300 and the negative partial sum accumulator 302 according to some aspects may each provide more bits in the fractions 304 and 306 relative to the fractions 206, 214. For example, in FIG. 3, the fractions 206, 214 each comprise 10 bits, while the fractions 304, 306 each comprise 31 bits. Likewise, some aspects may also provide additional bits in the exponents 308 and 310 of the positive partial sum accumulator 300 and the negative partial sum accumulator 302, respectively. In the example of FIG. 3, the exponents 204, 212 each comprise five (5) bits, while the exponents 308, 310 each comprise eight (8) bits.

In some aspects, the matrix processors 144(0)-144(M) may be configured to calculate inner products, which would require only units for performing addition and subtraction instead of also requiring multiplication units. The matrix processors 144(0)-144(M) according to some aspects may also be configured to use different resolutions for the input values and the partial sum accumulators. For example, rather than using 32 bits for each of the positive partial sum accumulator 300 and the negative partial sum accumulator 302, the positive partial sum accumulator 300 and the negative partial sum accumulator 302 may each comprise 64 bits.

Figure 4:
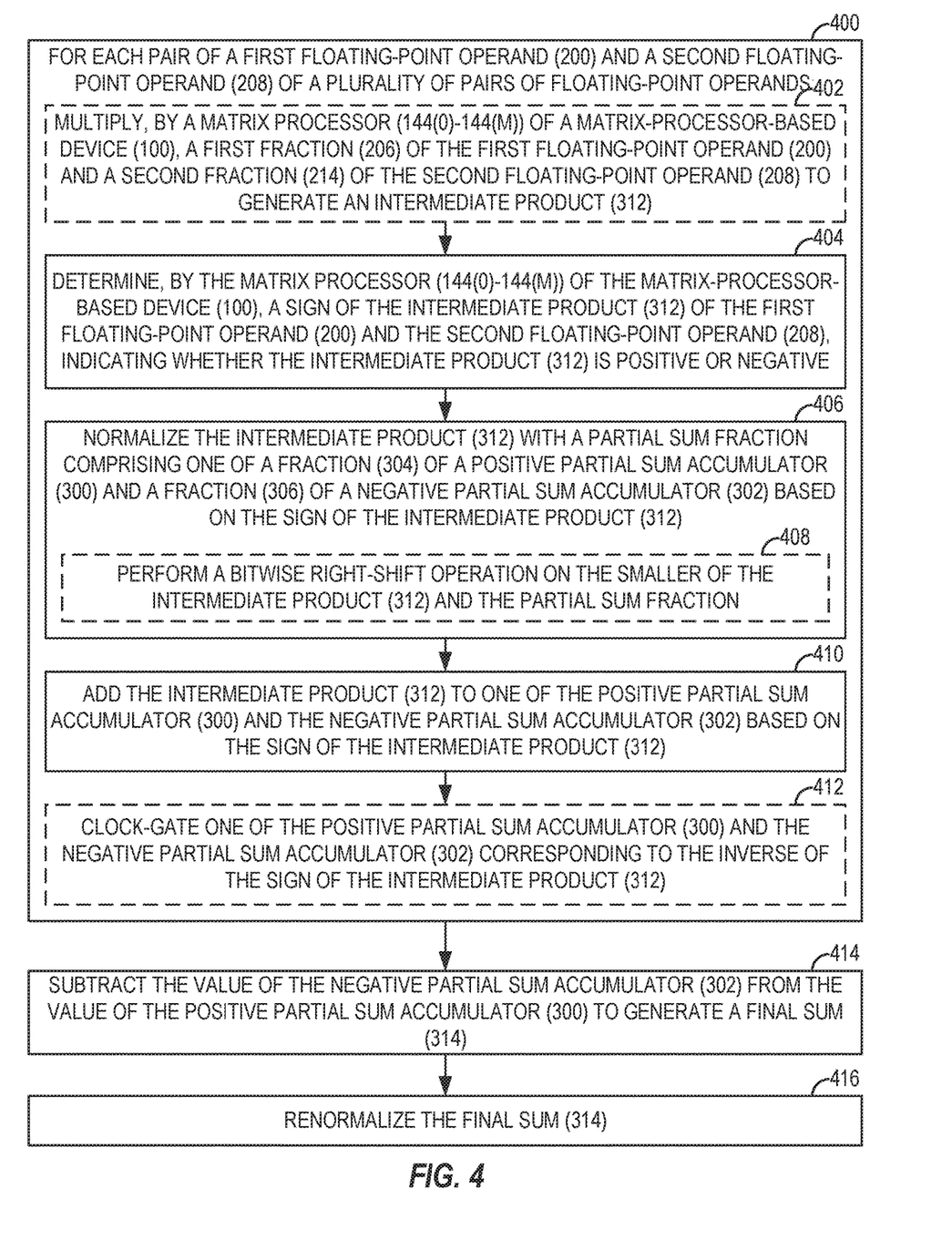
FIG. 4 is a flowchart illustrating exemplary operations of the processor-based system of FIGS. 1A and 1B for efficiently performing floating-point matrix multiplication using matrix processors.

To illustrate exemplary operations of the matrix-processor-based device 100 of FIG. 1 for performing efficient floating-point matrix multiplication using matrix processors, FIG. 4 is provided. For the sake of clarity, elements of FIGS. 1A, 1B, and 3 are referenced in describing FIG. 4. Operations in FIG. 4 begin with a series of operations being performed by a matrix processor, such as one of the matrix processors 144(0)-144(M) of FIG. 1B, for each pair of a first floating-point operand 200 and a second floating-point operand 208 of a plurality of pairs of floating-point operands (block 400). In some aspect, the matrix processor 144(0)-144(M) may multiply the first fraction 206 of the first floating-point operand 200 and the second fraction 214 of the second floating-point operand 208 to generate the intermediate product (block 402). In this regard, the matrix processor 144(0)-144(M) may be referred to herein as "a means for multiplying a first fraction of the first floating-point operand and a second fraction of the second floating-point operand to generate the intermediate product."

The matrix processor 144(0)-144(M) determines the sign of the intermediate product 312 of the first floating-point operand 200 and the second floating-point operand 208, indicating whether the intermediate product 312 is positive or negative (block 404). Accordingly, the matrix processor 144(0)-144(M) may be referred to herein as "a means for determining, for each pair of a first floating-point operand and a second floating-point operand of a plurality of pairs of floating-point operands, a sign of an intermediate product of the first floating-point operand and the second floating-point operand, indicating whether the intermediate product is positive or negative." The matrix processor 144(0)-144(M) then normalizes the intermediate product 312 with a partial sum fraction comprising one of the fraction 304 of the positive partial sum accumulator 300 and the fraction 306 of the negative partial sum accumulator 302 based on the sign of the intermediate product 312 (block 406). The matrix processor 144(0)-144(M) thus may be referred to herein as "a means for normalizing the intermediate product with a partial sum fraction comprising one of a fraction of a positive partial sum accumulator and a fraction of a negative partial sum accumulator based on the sign of the intermediate product." In some aspects, operations of block 406 for normalizing the intermediate product with the partial sum fraction may include performing a bitwise right-shift operation on the smaller of the intermediate product 312 and the partial sum fraction (block 408). In this regard, the matrix processor 144(0)-144(M) may be referred to herein as "a means for performing a bitwise right-shift operation on the smaller of the intermediate product and the partial sum fraction."

The matrix processor 144(0)-144(M) then adds the intermediate product 312 to one of the positive partial sum accumulator 300 and the negative partial sum accumulator 302 based on the sign of the intermediate product 312 (block 410). Accordingly, the matrix processor 144(0)-144(M) may be referred to herein as "a means for adding the intermediate product to one of the positive partial sum accumulator and the negative partial sum accumulator based on the sign of the intermediate product." According to some aspects, the matrix processor 144(0)-144(M) may also clock-gate one of the positive partial sum accumulator 300 and the negative partial sum accumulator 302 corresponding to the inverse of the sign of the intermediate product 312 (block 412). The matrix processor 144(0)-144(M) thus may be referred to herein as "a means for clock-gating one of the positive partial sum accumulator and the negative partial sum accumulator corresponding to the inverse of the sign of the intermediate product."

After processing each pair of the plurality of pairs of floating-point operands, the matrix processor 144(0)-144(M) subtracts the value of the negative partial sum accumulator 302 from the value of the positive partial sum accumulator 300 to generate a final sum 314 (block 414). In this regard, the matrix processor 144(0)-144(M) may be referred to herein as "a means for subtracting the value of the negative partial sum accumulator from the value of the positive partial sum accumulator to generate a final sum." The matrix processor 144(0)-144(M) then renormalizes the final sum 314 (block 416). Accordingly, the matrix processor 144(0)-144(M) may be referred to herein as "a means for renormalizing the final sum."

Providing efficient floating-point operations using matrix processors in processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
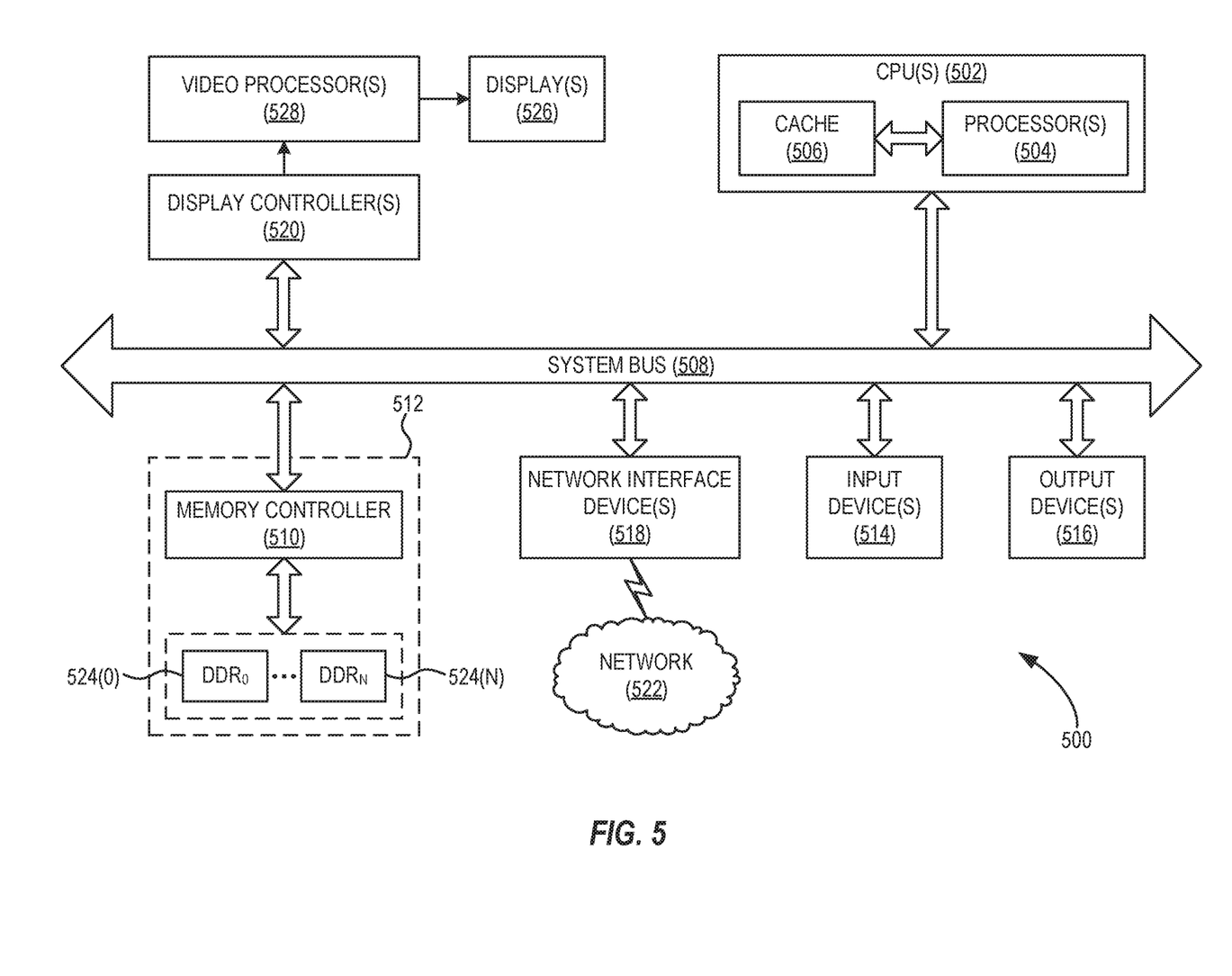
FIG. 5 is a block diagram of an exemplary processor-based system that can comprise the matrix processors of FIGS. 1A and 1B for providing efficient floating-point operations.

In this regard, FIG. 5 illustrates an example of a processor-based system 500 that may correspond to the matrix-processor-based device 100 of FIG. 1A, and which may comprise the matrix processors 144(0)-144(M) of FIG. 1B. The processor-based system 500 includes one or more CPUs 502, each including one or more processors 504. The CPU(s) 502 may have cache memory 506 coupled to the processor(s) 504 for rapid access to temporarily stored data. The CPU(s) 502 is coupled to a system bus 508 and can intercouple master and slave devices included in the processor-based system 500. As is well known, the CPU(s) 502 communicates with these other devices by exchanging address, control, and data information over the system bus 508. For example, the CPU(s) 502 can communicate bus transaction requests to a memory controller 510 as an example of a slave device.

Other master and slave devices can be connected to the system bus 508. As illustrated in FIG. 5, these devices can include a memory system 512, one or more input devices 514, one or more output devices 516, one or more network interface devices 518, and one or more display controllers 520, as examples. The input device(s) 514 can include any type of input device, including but not limited to input keys, switches, voice processors, etc. The output device(s) 516 can include any type of output device, including, but not limited to, audio, video, other visual indicators, etc. The network interface device(s) 518 can be any devices configured to allow exchange of data to and from a network 522. The network 522 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 518 can be configured to support any type of communications protocol desired. The memory system 512 can include one or more memory units 524(0)-524(N).

The CPU(s) 502 may also be configured to access the display controller(s) 520 over the system bus 508 to control information sent to one or more displays 526. The display controller(s) 520 sends information to the display(s) 526 to be displayed via one or more video processors 528 (e.g., one or more graphics processing units (GPUs), as a non-limiting example), which process the information to be displayed into a format suitable for the display(s) 526. The display(s) 526 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary, aspects herein are described to provide examples and discussion. The operations described may be performed in numerous different sequences other than the illustrated sequences. Furthermore, operations described in a single operational step may actually, be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A matrix-processor-based device comprising a matrix processor comprising an adder circuit coupled to a positive partial sum accumulator register and a negative partial sum accumulator register,
the matrix processor configured to:
for each pair of a first floating-point operand and a second floating-point operand of a plurality of pairs of floating-point operands:
determine a sign of an intermediate product of the first floating-point operand and the second floating-point operand, indicating whether the intermediate product is positive or negative; and
normalize the intermediate product with a partial sum fraction comprising a fraction of one of the positive partial sum accumulator register and the negative partial sum accumulator register based on the sign of the intermediate product;
the adder circuit configured to add the intermediate product to the partial sum fraction to generate a sum that is not normalized; and
the matrix processor further configured to:
store the sum in the one of the positive partial sum accumulator register and the negative partial sum accumulator register;
subtract a value of the negative partial sum accumulator register from a value of the positive partial sum accumulator register to generate a final sum; and
renormalize the final sum.

2. The matrix-processor-based device of claim 1, wherein the matrix processor is further configured to multiply a first fraction of the first floating-point operand and a second fraction of the second floating-point operand to generate the intermediate product.

3. The matrix-processor-based device of claim 2, wherein the matrix processor is configured to normalize the intermediate product with the partial sum fraction by being configured to perform a bitwise right-shift operation on the smaller of the intermediate product and the partial sum fraction.

4. The matrix-processor-based device of claim 1, wherein the matrix processor is further configured to clock-gate one of the positive partial sum accumulator register and the negative partial sum accumulator register corresponding to the inverse of the sign of the intermediate product.

5. The matrix-processor-based device of claim 1, wherein:
a fraction of the first floating-point operand and a fraction of the second floating-point operand each comprise 10 bits; and
the fraction of the positive partial sum accumulator register and the fraction of the negative partial sum accumulator register each comprise 31 bits.

6. The matrix-processor-based device of claim 1, wherein:
an exponent of the first floating-point operand and an exponent of the second floating-point operand each comprise five (5) bits; and
an exponent of the positive partial sum accumulator register and an exponent of the negative partial sum accumulator register each comprise eight (8) bits.

7. The matrix-processor-based device of claim 1 integrated into an integrated circuit (IC).

8. The matrix-processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A matrix-processor-based device, comprising:
a means for determining, for each pair of a first floating-point operand and a second floating-point operand of a plurality of pairs of floating-point operands, a sign of an intermediate product of the first floating-point operand and the second floating-point operand, indicating whether the intermediate product is positive or negative;
a means for normalizing the intermediate product with a partial sum fraction comprising a fraction of one of a positive partial sum accumulator register and a negative partial sum accumulator register based on the sign of the intermediate product;
a means for adding the intermediate product to the partial sum fraction to generate a sum that is not normalized, and storing the sum in the one of the positive partial sum accumulator register and the negative partial sum accumulator register, the means for adding coupled to the positive partial sum accumulator register and the negative partial sum accumulator register;
a means for subtracting a value of the negative partial sum accumulator register from a value of the positive partial sum accumulator register to generate a final sum; and
a means for renormalizing the final sum.

10. The matrix-processor-based device of claim 9, further comprising a means for multiplying a first fraction of the first floating-point operand and a second fraction of the second floating-point operand to generate the intermediate product.

11. The matrix-processor-based device of claim 10, wherein the means for normalizing the intermediate product with the partial sum fraction comprises a means for performing a bitwise right-shift operation on the smaller of the intermediate product and the partial sum fraction.

12. The matrix-processor-based device of claim 9, further comprising a means for clock-gating one of the positive partial sum accumulator register and the negative partial sum accumulator register corresponding to the inverse of the sign of the intermediate product.

13. The matrix-processor-based device of claim 9, wherein;

a fraction of the first floating-point operand and a fraction of the second floating-point operand each comprise 10 bits; and the fraction of the positive partial sum accumulator register and the fraction of the negative partial sum accumulator register each comprise 31 bits.

14. The matrix-processor-based device of claim 9, wherein:

an exponent of the first floating-point operand and an exponent of the second floating-point operand each comprise five (5) bits; and an exponent of the positive partial sum accumulator register and an exponent of the negative partial sum accumulator register each comprise eight (8) bits.

15. A method for providing efficient floating-point operations, comprising:

for each pair of a first floating-point operand and a second floating-point operand of a plurality of pairs of floating-point operands:

determining, by a matrix processor of a matrix-processor-based device, a sign of an intermediate product of the first floating-point operand and the second floating-point operand, indicating whether the intermediate product is positive or negative;

normalizing the intermediate product with a partial sum fraction comprising a fraction of one of a positive partial sum accumulator register and a negative partial sum accumulator register based on the sign of the intermediate product;

adding, in an adder circuit coupled to the positive partial sum accumulator register and the negative partial sum accumulator register, the intermediate product to the partial sum factor to generate a sum that is not normalized; and storing the sum in the one of the positive partial sum accumulator register and the negative partial sum accumulator register;

subtracting a value of the negative partial sum accumulator register from a value of the positive partial sum accumulator register to generate a final sum; and renormalizing the final sum.

16. The method of claim 15, further comprising multiplying, by the matrix processor, a first fraction of the first floating-point operand and a second fraction of the second floating-point operand to generate the intermediate product.

17. The method of claim 16, wherein normalizing the intermediate product with the partial sum fraction comprises performing a bitwise right-shift operation on the smaller of the intermediate product and the partial sum fraction.

18. The method of claim 15, further comprising clock-gating one of the positive partial sum accumulator register and the negative partial sum accumulator register corresponding to the inverse of the sign of the intermediate product.

19. The method of claim 15, wherein;

a fraction of the first floating-point operand and a fraction of the second floating-point operand each comprise 10 bits; and the fraction of the positive partial sum accumulator register and the fraction of the negative partial sum accumulator register each comprise 31 bits.

20. The method of claim 15, wherein:

an exponent of the first floating-point operand and an exponent of the second floating-point operand each comprise five (5) bits; and an exponent of the positive partial sum accumulator register and an exponent of the negative partial sum accumulator register each comprise eight (8) bits.

* * * * *